July 16, 1929.  R. A. CARDOSO ET AL  1,721,371
SYSTEM FOR IDENTIFYING PERSONS, APPLICABLE TO
SLOT AND REGISTERING MACHINES
Filed Sept. 2, 1926
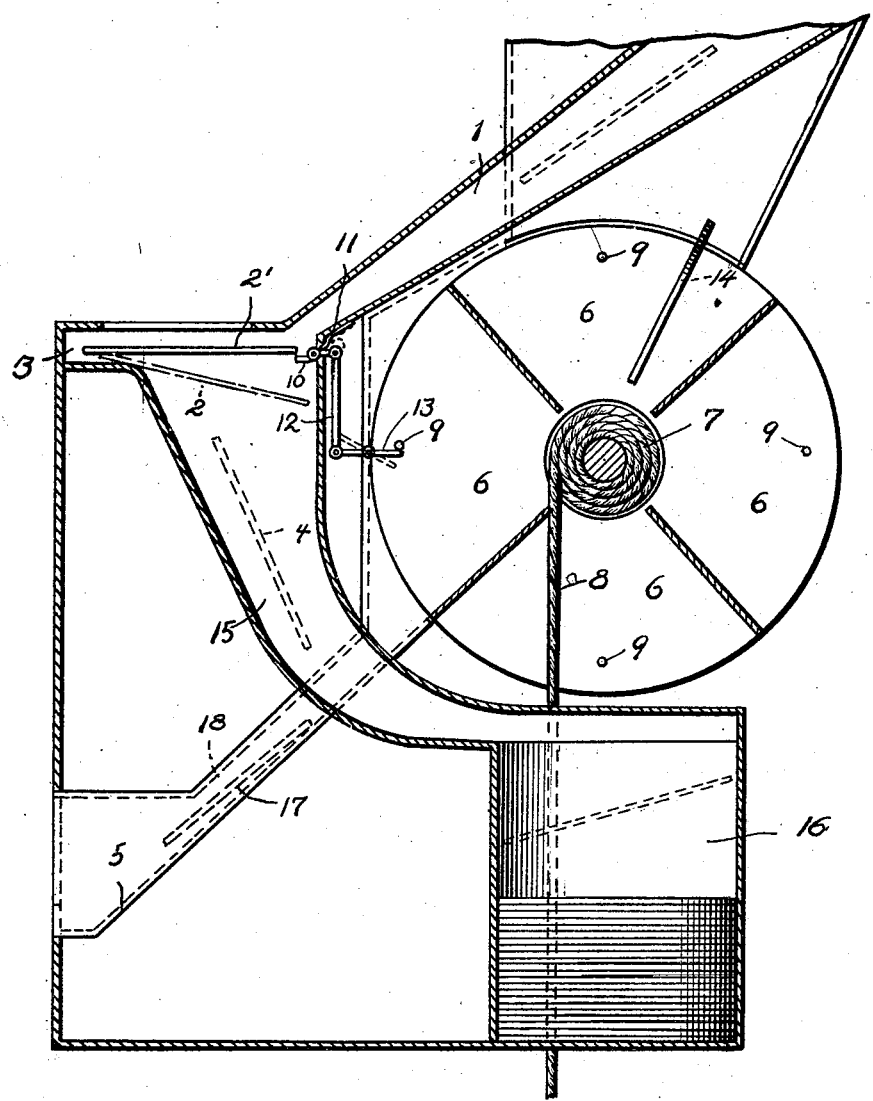
INVENTORS:
R. A. Cardoso, A. S. Merlan and J. C. Mir
BY Marks & Clerk
ATTORNEYS.

Patented July 16, 1929.

1,721,371

UNITED STATES PATENT OFFICE.

RUFINO ACOSTA CARDOSO, ANGEL SILVANO MERLÁN, AND JORGE CAZE MIR, OF BUENOS AIRES, ARGENTINA.

SYSTEM FOR IDENTIFYING PERSONS, APPLICABLE TO SLOT AND REGISTERING MACHINES.

Application filed September 2, 1926. Serial No. 133,280.

It is universally known that the digital impression system constitutes the most efficient source of identification of individuals and that this system has always been used voluntarily by a person who wants his impressions (identification) recorded.

It is also known that there are a great number of machines that deliver tickets, or that furnish a coupon, by means of the dropping of a coin, these machines generally being called slot machines. In these kinds of machines there is no possible manner of preventing violation or of identifying the operator or purchaser. In other words the owner of the machine does not know if the holder of a ticket is really the purchaser of the same.

With the object of showing the value of this invention we will take the case of these machines being used as automatic delivering devices devoted to a serious purpose. Let us suppose that the said machines are being used for the delivery of an insurance ticket to a purchaser, the insurance covering accidents, and where the ticket insurance policy is valid for a precarious term and under determined conditions. At present the insured party who has obtained a ticket from one of the said machines, may or may not be the person who has been injured in an accident of any kind, and it is impossible to determine whether the party who holds the insurance ticket is the one entitled to compensation.

The present invention relates to the provision of a piece of mechanism which may be fitted to any slot machine that will deliver a ticket, whether or not the said machine is operated by means of a coin, that is to whether it is automatic or semi-automatic. The machine is started by the pressure exerted by the operator with his finger, which pressure has to be applied in a place already determined and which has previously been prepared to receive the papillary impression of the finger in such a way as to leave the small prominences of the skin on that place. This is done by means of a chip (disk) which has a prepared surface of plastic material capable of retaining the said impression.

So that the invention can be readily understood we will refer to the accompanying drawing, in which is shown a section of one of the various forms of the invention, although this special form is only to show its possible realization into practice.

Through the channel —1— falls a chip —2— the surface of which has been covered by a substance sufficiently soft to acquire or retain the papillary impression. This chip —2— by reason of the accumulated energy of its fall becomes placed in the position shown at —2'— assisted by the shape of the frame —3—. In the meantime, and as the result of the operation of the slot mechanism, which is not a part of this invention, the card or ticket —18— drops through the channel or conduit —5— and comes to a standstill at one of the compartments —6— into which the drum —7— is divided. This drum —7— is always ready to turn owing to the force exerted on it by the counterweight —8—. It must be noted that near the edge of the drum a series of butts —9— are located which prevent the continous rotation of the drum.

The chip —2— once it is in the position illustrated and lying in the position referred in the frame —3— and on the arm of the lever —10— which is kept in position by means of the spring —11— is located exactly where the operator must apply the pressure of his finger to obtain the ticket that comes from the drum —7—. This lever —10— has a connecting rod —12— which operates the second lever —13— and holds the drum —7— steady by means of the butt —9—.

The mechanism operates in the following way:

The buyer after he has placed the coin in the slot machine observes that the chip comes to the position illustrated in the drawing. Simultaneously the card or ticket —5— has occupied the compartment —6— of the drum —7—. For the buyer to obtain the card or ticket —5— it is necessary for him to exert the pressure of a finger on the upper surface of the exposed chip and in this connection it is necessary that the inner surface of the slot part of the forefinger for instance be engaged with the prepared surface of the chip. This pressure on the chip causes the lever —10— to act against the spring —11— which obliges the operator to apply the proper pressure to the chip, and therefore have an adequate impression on the material covering the chip. The movement of the lever —10— frees the chip which then drops to the position as shown at —14— by way of the channel —15— into the deposit receptacle —16— As the lever —10— rises, it brings with it the lever —13— by means of the connecting rod —12— freeing the counterweight —16— which turns the drum —7— until the compartment —6— comes in front of the channel —17— delivering the ticket or card —18—. When the chip —2— drops into the storage deposit and the ticket is delivered to the buyer, the mechanism returns or is restored to its initial position.

What we claim as our invention, and desire to secure by Letters Patent, is:

1. An identification attachment for slot machines, including in combination with the delivery chute of the slot machine, means for presenting finger print receiving members in position to receive a finger print incident to each operation of the slot machine, means arranged transversely of the delivery chute for temporary retaining the article dispensed by the slot machine, and an operable connection between the means for presenting the finger print receiving members and the last mentioned means to cause the later to operate simultaneously with the presenting means.

2. An identification attachment for slot machines, including in combination with the delivery chute of the slot machine, a drum arranged transversely thereof for temporarily retaining the article dispensed by the slot machine, and means for presenting finger print receiving members in position to receive a finger print incident to each operation of the slot machine and an operable connection between the last mentioned means and the drum, substantially as and for the purposes set forth.

3. An identification attachment for slot machines, including in combination with the delivery chute of the slot machine, a drum arranged transversely of the chute provided with partitions intercepting the article being dispensed, means for presenting finger print receiving members into position to receive a finger print incident to each operation of the machine, said last mentioned means including a spring pressed retaining lever for the finger print receiving members, stops on the drum, a pivotally mounted lever adapted to successively engage the stops on the drum, an operative connection between the drum, retaining lever and the spring pressed lever to effect the release of the drum simultaneously with the imprinting and releasing of the presented finger print receiving member, and a deposit receptacle for receiving the imprinted finger print receiving members.

In testimony whereof we affix our signatures.

R. ACOSTA CARDOSO.
ANGEL S. MERLÁN.
JORGE CAZE MIR.